US009465369B2

(12) United States Patent
Saha et al.

(10) Patent No.: US 9,465,369 B2
(45) Date of Patent: Oct. 11, 2016

(54) SYSTEM METHOD FOR SENDING MESSAGES AND COMMANDS TO A DEVICE AT A LOCATION DISTANCED FROM THE SENDING DEVICE

(71) Applicant: SONY CORPORATION, Tokyo (JP)

(72) Inventors: Dipendu Saha, San Diego, CA (US); Prem Venkatesan, San Diego, CA (US); Steven Friedlander, San Diego, CA (US); Nobuyuki Fujiwara, Sunnyvale, CA (US); Paul Douglas Heavener, Jr., Punta Gorda, FL (US)

(73) Assignee: SONY CORPORATION, Tokyo (JP)

( * ) Notice: Subject to any disclaimer, the term of this patent is extended or adjusted under 35 U.S.C. 154(b) by 506 days.

(21) Appl. No.: 13/755,429

(22) Filed: Jan. 31, 2013

(65) Prior Publication Data

US 2014/0211099 A1   Jul. 31, 2014

(51) Int. Cl.
| | |
|---|---|
| *H04L 12/28* | (2006.01) |
| *G05B 1/01* | (2006.01) |
| *H04W 4/02* | (2009.01) |
| *H04W 4/20* | (2009.01) |

(52) U.S. Cl.
CPC ............ *G05B 1/01* (2013.01); *H04L 12/2818* (2013.01); *H04W 4/021* (2013.01); *H04W 4/20* (2013.01)

(58) Field of Classification Search
CPC .... G05B 1/01; H04L 12/2818; H04W 4/021; H04W 4/20

USPC .......................................................... 340/4.61
See application file for complete search history.

(56) References Cited

U.S. PATENT DOCUMENTS

| | | | |
|---|---|---|---|
| 6,909,891 B2 * | 6/2005 | Yamashita | H04M 1/72533 455/418 |
| 8,849,301 B2 * | 9/2014 | Husney | H04W 4/02 455/456.1 |
| 2007/0032225 A1 | 2/2007 | Konicek | |
| 2008/0045236 A1 | 2/2008 | Nahon et al. | |
| 2011/0054780 A1 | 3/2011 | Dhanani et al. | |
| 2011/0218650 A1 * | 9/2011 | Crucs | G05B 11/01 700/13 |

FOREIGN PATENT DOCUMENTS

JP      2006013563 A  *  1/2006

* cited by examiner

*Primary Examiner* — Brian Zimmerman
*Assistant Examiner* — Sara Samson
(74) *Attorney, Agent, or Firm* — John L. Rogitz; John M. Rogitz (57) ABSTRACT

A consumer electronics (CE) device includes at least one processor and at least one computer readable storage medium accessible to the processor. The medium is programmed with instructions that, when executed by the processor, cause the processor to execute logic including detecting the position of the CE device and sending a command to at least one apparatus at a location distanced from the CE device to establish at least one configuration of the apparatus. The command is sent responsive to a determination that the CE device is passing a predefined distance from a location.

20 Claims, 10 Drawing Sheets

Settings UI sample (Web Page)

SYSTEM METHOD FOR SENDING MESSAGES AND COMMANDS TO A DEVICE AT A LOCATION DISTANCED FROM THE SENDING DEVICE

FIELD OF THE INVENTION

The present application is directed to sending messages and commands from consumer electronics devices such as smartphones and onboard electronic vehicle systems to other devices.

BACKGROUND OF THE INVENTION

The increasing prevalence of mobile, hand-held, and touch screen consumer electronics (CE) devices has increased the ability of CE device users to communicate with each other. Present principles recognize that such CE devices may be further utilized in heretofore untaught ways and further developed for communication purposes, as well as be used to control other devices as described below.

SUMMARY OF THE INVENTION

Accordingly, as recognized herein, CE devices may be used to send commands to other devices at one or more locations in advance of the user of the CE device arriving at the location(s) to, e.g., "start up" the location's electronic environment. For instance, the user can manipulate the CE device described herein to turn on a television, tune to a particular channel, turn the volume to a particular level, set a particular brightness level, set a sleep timer, connect the device to the Internet, begin downloading data to the TV such as audio video content from, e.g., Netflix or Google TV, cause a welcome screen to be presented on the TV display, cause a weather report to be presented on the TV display, begin playback of a audio video file on a DVR and/or video player associated with the TV, etc. Still other CE devices and capabilities are described herein, such as electronic message boards that present information to users at the location that was received from a CE device distanced from the location.

Thus, in one embodiment a CE device includes at least one processor and at least one computer readable storage medium accessible to the processor. The medium is programmed with instructions which, when executed by the processor, cause the processor to execute logic including sending a message to a recipient apparatus at a home location that a user of the CE device is approaching the home location responsive to a determination that the CE device is passing an outer distance from the home location going toward the home location. The logic also includes sending a command to at least one appliance at the home location to establish at least one configuration of the appliance responsive to a determination that the CE device is passing the outer distance from the home location going toward the home location.

In addition, the logic includes sending a message to a recipient apparatus at the home location that a user of the CE device is approaching the home location responsive to a determination that the CE device is passing an inner distance from the home location going toward the home location, where the inner distance is less than the outer distance. Moreover, the logic includes sending a command to at least one appliance at the home location to establish at least one configuration of the appliance responsive to a determination that the CE device is passing the inner distance from the home location going toward the home location. The CE device may be a computing device on a vehicle or a smartphone in some embodiments.

Also if desired, the logic can include sending a message to a recipient apparatus at the home location that a user of the CE device is moving away from the home location responsive to a determination that the CE device is passing the outer distance from the home location going away from the home location. Additionally, in some embodiments the logic may include sending a command to at least one appliance at the home location to establish at least one configuration of the appliance responsive to a determination that the CE device is passing the outer distance from the home location going away from the home location. Also in some embodiments, the logic can include sending a message to a recipient apparatus at the home location that a user of the CE device is moving away from the home location responsive to a determination that the CE device is passing the inner distance from the home location going away from the home location. Further, the logic may include sending a command to at least one appliance at the home location to establish at least one configuration of the appliance responsive to a determination that the CE device is passing the inner distance from the home location going away from the home location.

In addition to the foregoing, in some embodiments the configuration of the appliance can be established responsive to the determination that the CE device is passing the inner distance from the home location going toward the home location such that the appliance is powered on and/or exits a low power state. Likewise, if desired, the configuration can be established responsive to the determination that the CE device is passing the inner distance from the home location going away from the home location such that the appliance is powered down and/or enters a low power state.

Also, it is to be understood that in exemplary embodiments, at least one of the appliances can be a television. Thus, the command can be sent to a TV, where the command can be to power on the TV and to even cause the television to present content from a channel selected by the user of the CE device. Also in exemplary embodiments, at least one of the commands to establish at least one configuration of at least one of the appliances can be to launch an application (e.g., an "App") associated with the appliance, where the appliance may be a touch-enabled device such as a tablet computer. It is to also be understood that in certain embodiments, the recipient appliance/apparatus described above may be an electronic message board that can be disposed on a surface at the location.

In another aspect, a method includes detecting the position of a CE device and sending a command to at least on apparatus at a home location to establish at least one configuration of the apparatus responsive to a determination that the CE device is passing a predefined distance from the home location.

In still another aspect, a television (TV) includes at least one processor and at least one computer readable storage medium accessible to the processor. The medium is programmed with instructions which, when executed by the processor, cause the processor to execute logic including receiving a command to establish at least one configuration of the TV. It is to be understood that the command is sent from a consumer electronics device distanced from the TV responsive to a determination that the CE device is passing a predefined distance from the location of the TV. The logic then includes configuring the TV based on the command.

The details of the present invention, both as to its structure and operation, can best be understood in reference to the

DETAILED DESCRIPTION OF THE PREFERRED EMBODIMENT

It is to be understood that the figures below generally show methods steps in conjunction with the devices disclosed herein.

Figure 1:
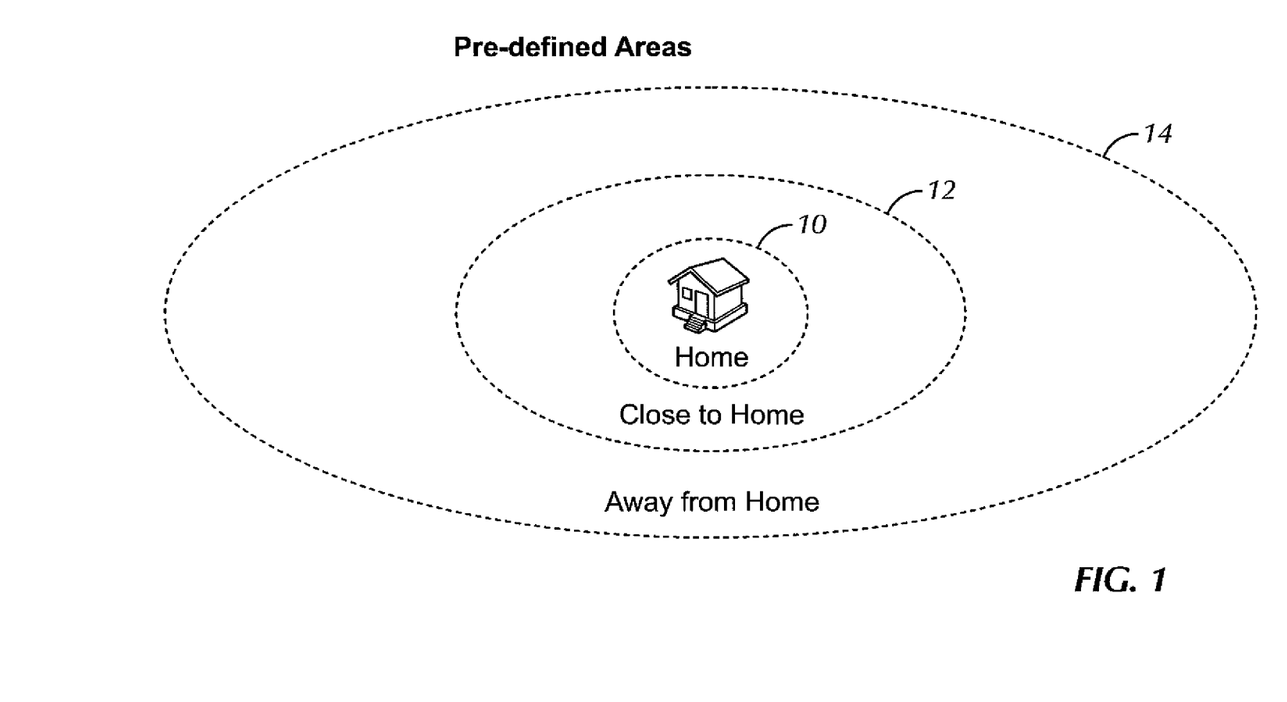
FIG. 1 is a block diagram of an example "home location" with two perimeters surrounding the home location.

Beginning in reference to FIG. 1, a location 10 is shown. In this case, the location is a "home" location that is a single family residence, although it is to be understood that present principles may apply to other locations as well, such as, e.g., an office and/or office building, a restaurant, a retail store, an apartment home or condo, library, etc. Regardless, as may be appreciated from FIG. 1, an inner distance 12 and outer distance 14 are shown. The distances 12 and 14 are generally understood to establish circumferences around the home location 10 with the home location 10 at the center, although other perimeters and geometric boundaries may be established, selected, and/or used in accordance with present principles. For instance, a user may establish the home location 10 and any other perimeters by inputting desired distances and/or radii into a networked computer at the home location that is used to facilitate and/or perform the principles and actions set forth herein, and/or a server may be similarly used and receive user input.

Thus, in the embodiment shown, the inner distance 12 may be, e.g., a circumference established by a one mile radius from the home location 10. The outer distance 14 may be, e.g., a circumference established by a two mile radius from the home location 10, although it is to be generally understood that the outer distance 14 can be any distance or radius greater than that of the inner distance 12.

Figure 2:
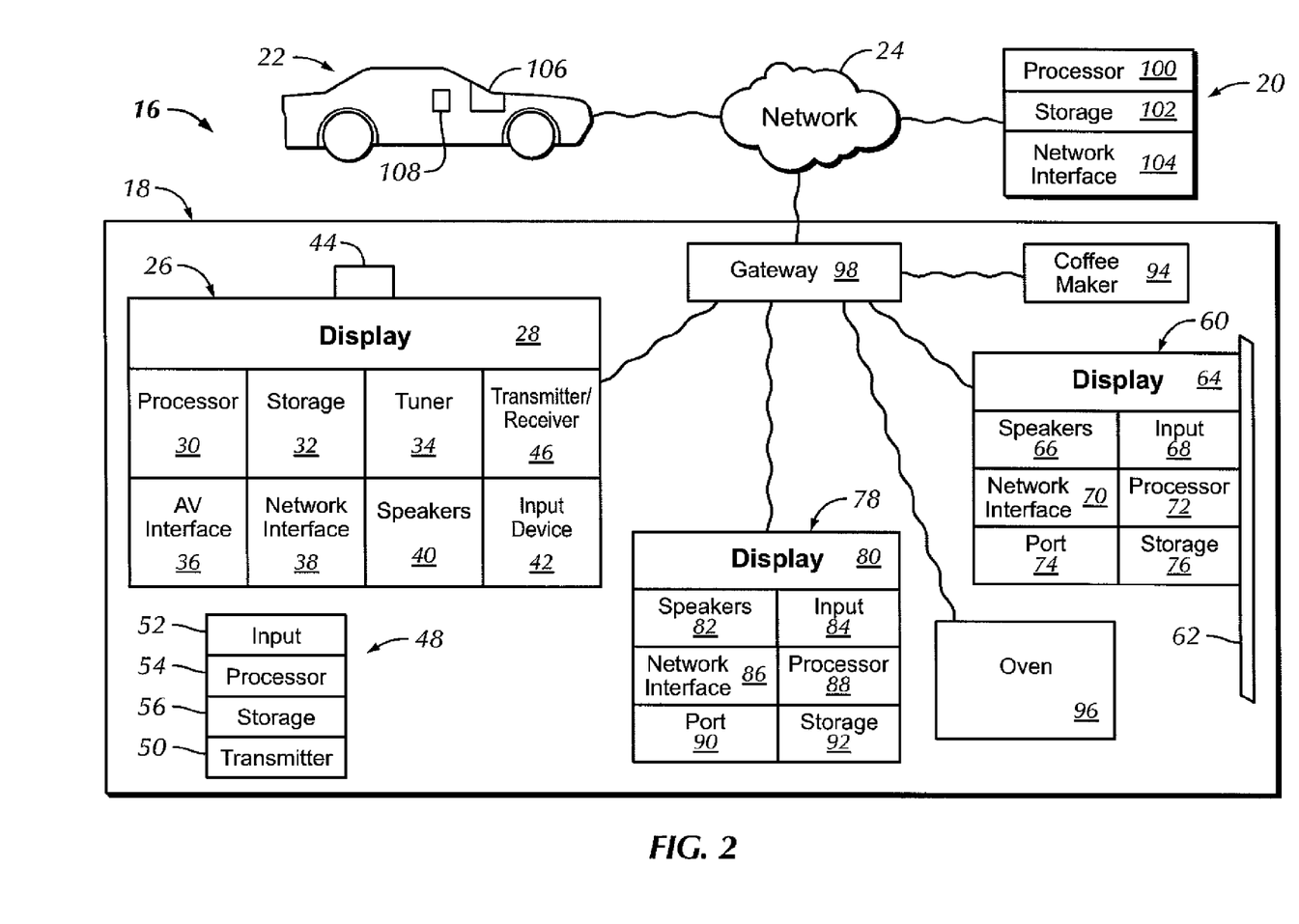
FIG. 2 is a block diagram of an example system showing a "home location," a server, and at least one CE device distanced form the home location.

Now in reference to FIG. 2, an exemplary system 16 is shown. The system 16 includes a home location 18, a server 20, and a vehicle 22, where all three are in communication with each other over a network 24 such as, e.g., the Internet, a WAN, etc. First describing the home location 18 shown in FIG. 2, the location 18 includes a television (TV) 26 that may be, e.g., Internet-enabled, a smart TV, and/or a touch enabled TV. Thus, the TV 26 includes a touch-enabled display 28. The TV 26 also includes a processor 30 controlling the TV 26, a tangible computer readable storage medium 32 such as disk-based or solid state storage, and a TV tuner 34.

In addition, the TV 26 includes an audio/video interface 36 to communicate with other devices connected to the TV 26 such as, e.g., a set-top box, a DVD player, or a video game console over, e.g., an HDMI connection. The TV 26 also includes a network interface 38 such as, e.g., a wired or wireless modem or router, or other appropriate interface such as, e.g., a wireless telephony transceiver, it being understood that the network interface 38 communicates with the other devices described herein over the network 24. Furthermore, the TV 26 includes at least one speaker 40 and at least one input device 42 such as, e.g., a keypad and/or audio receiver/microphone for receiving voice commands and input. Note that a camera 44 is also shown and may be, e.g., a thermal imaging camera, a digital camera such as a webcam, and/or camera integrated into a TV 26. Either way, the camera 44 is controllable by the processor 30 to gather pictures/images and video of viewers/users of the TV 26. Though not shown, in certain embodiments the TV 26 may also include a GPS receiver.

Still in reference to the TV 26, it also includes a transmitter/receiver 46 for communicating with a TV remote control (RC) 48 associated with the TV 26 to input commands to the TV 26 using the RC 48. Accordingly, the RC 48 has a transmitter/receiver 50 for communicating with the TV 26 through the transmitter/receiver 46. The RC 48 also includes an input device 52 such as a keypad or touch screen display, as well as a processor 54 for controlling the RC 48, and a tangible computer readable storage medium 56 such as disk-based or solid state storage.

FIG. 1 also shows an electronic message board 60 disposed on a wall 62 of the home location 18. In exemplary embodiments, the message board 60 may be disposed on the wall 62 such that the screen/display of the message board 60 is flush with the surface of the wall 62. Regardless, the message board 60 is understood to include a touch enabled display 64, one or more speaker 66 for outputting audio such as audible alerts, and an additional input device 68 such as, e.g., a track pad or an audio receiver/microphone for receiving voice commands and other input. The message board 60 also includes a network interface 70 for communication over the network 24 under control of a processor 72, it being understood that the processor 72 controls the message board 60. The network interface 70 may be, e.g., a wired or wireless modem or router, or other appropriate interface such as, e.g., a wireless telephony transceiver.

In addition, the message board 60 includes an input port 74 such as, e.g., a USB port, as well as a tangible computer readable storage medium 76 such as disk-based or solid state storage. Moreover, a GPS receiver may included on the message board 60 and, though not shown, may be configured to receive geographic position information from at least one satellite and provide the information to the processor 72, though it is to be understood that another suitable position receiver other than a GPS receiver may be used in accordance with present principles.

Furthermore, it is to be understood that the message board 60 may be disposed in a common area of the home location 18 and/or a portion of the location 18 where it is easily viewable by people in the home location 18. In addition, the message board 60 may display statuses and messages in reverse-chronological order as they are received from at least one CE device distanced from the home location 18 in accordance with present principles such that the most recent status or message is presented at the top of the board 60, as will be described further below in reference to FIG. 16.

Still in reference to the home location 18 of FIG. 2, a smartphone 78 is also shown. The smartphone 78 includes a touch enabled display 80, one or more speakers 82 for outputting audio such as audible alerts and an additional input device 84 such as, e.g., a track pad or an audio receiver/microphone for receiving voice commands and input. The smartphone 78 also includes a network interface 86 for communication over the network 24 under control of a processor 88 to, e.g., receive text messages and emails, it being understood that the processor 88 controls the smartphone 78. The network interface 86 may be, e.g., a wired or wireless modem or router, or other appropriate interface such as, e.g., a wireless telephony transceiver. In addition, the smartphone 78 includes an input port 90 such as, e.g., a USB port, and a tangible computer readable storage medium 92 such as disk-based or solid state storage. Moreover, a GPS receiver may be included on the smartphone 78, though not shown, and may be configured to receive geographic position information from at least one satellite and provide the information to the processor 88. However, it is to be understood that another suitable position receiver other than a GPS receiver may be used in accordance with present principles. Note that the smartphone 78 (as well as the TV 26) may have one or more applications stored on its computer readable storage medium 92 that can be executed by the processor 88 and, e.g., remotely initiated by a CE device distanced from the home location 18 in accordance with present principles.

Additionally, FIG. 2 shows a coffee maker 94 that is connected to the network 24 through a network interface (not shown) under control of a processor (also not shown), and may further include a computer readable storage medium similar to the ones described above. Thus, the coffee maker 94 is controllable from a CE device distanced from the home location 18 in accordance with present principles such that, e.g., a command may be sent from the CE device to begin brewing a pot of coffee.

Similarly, an oven 96 is also shown, may be connected to the network 24 through a network interface under control of a processor, may include a processor controlling the oven 96, and may include a computer readable storage medium similar to the ones described above. The oven 96 is thus also controllable from a CE device distanced from the home location 18 in accordance with present principles such that, e.g., a command maybe sent from the CE device to preheat the oven 96 to a desired temperature.

In addition to the foregoing, the home location 18 may also include a modem/router 98. Though not shown, the modem/router 98 includes a network interface to facilitate communication with, e.g., the respective devices/appliances 26, 60, 78, 94, and 96, the server 20, and the devices in the vehicle 22 to be described shortly. Thus, though also not shown, it is to be understood that the modem/router 98 includes a processor to control the modem/router 98 at least for such purposes, as well as a computer readable storage medium similar to the ones described above for storing, e.g., software code and/or logic for such purposes.

Now describing the server 20, it is to be understood that it includes at least one processor 100, at least one tangible computer readable storage medium 102 such as disk-based or solid state storage, and at least one network interface 104 that, under control of the processor 100, allows for communication over the network 24 with, e.g., the devices/appliances 26, 60, 78, 94, and 96 described above, as well as the devices in the vehicle 22. Note that the network interface 104 may be, e.g., a wired or wireless modem or router, or other appropriate interface such as, e.g., a wireless telephony transceiver. Accordingly, in some embodiments the server 20 may be an Internet server and may include "cloud" software, a "cloud" platform, and/or perform "cloud" functions such that the other CE devices and appliances described herein have access to a "cloud" environment via the server 20 to undertake present principles.

FIG. 2 also includes the vehicle 22 referenced above. It is to be understood that the vehicle 22 may include an on-board vehicle computer 106 that includes (though not shown for clarity) at least one processor controlling the computer 106, at least one tangible computer readable storage medium such as disk-based or solid state storage, and at least one network interface that, under control of the processor of the computer 106, allows for communication over the network 24 with, e.g., the devices/appliances 26, 60, 78, 94, and 96 described above, as well as the server 20. The network interface on the vehicle computer 106 may be, e.g., a wired or wireless modem or router, or other appropriate interface such as, e.g., a wireless telephony transceiver. The computer 106 may also include, e.g., a touch enabled display and/or other input means (e.g., a microphone) such that commands, messages, and/or user selections in accordance with present principles may be entered and sent to devices and appliances in the home location 18 at least while the computer 106 is distanced from the home location 18.

Last, a smartphone 108 or other CE device capable of communication over the network 24 may also be present in the vehicle 22. It is to be understood that the smartphone 108 may be substantially similar in function and configuration to the smartphone 78 described above. Thus, the smartphone 108 may also be used in accordance with present principles to send, e.g., commands, messages, and/or user selections to devices and appliances in the home location 18 at least while the smartphone 108 is distanced from the home location 18 using, e.g., GPS capabilities to detect when a particular distance has been passed.

Figure 3:
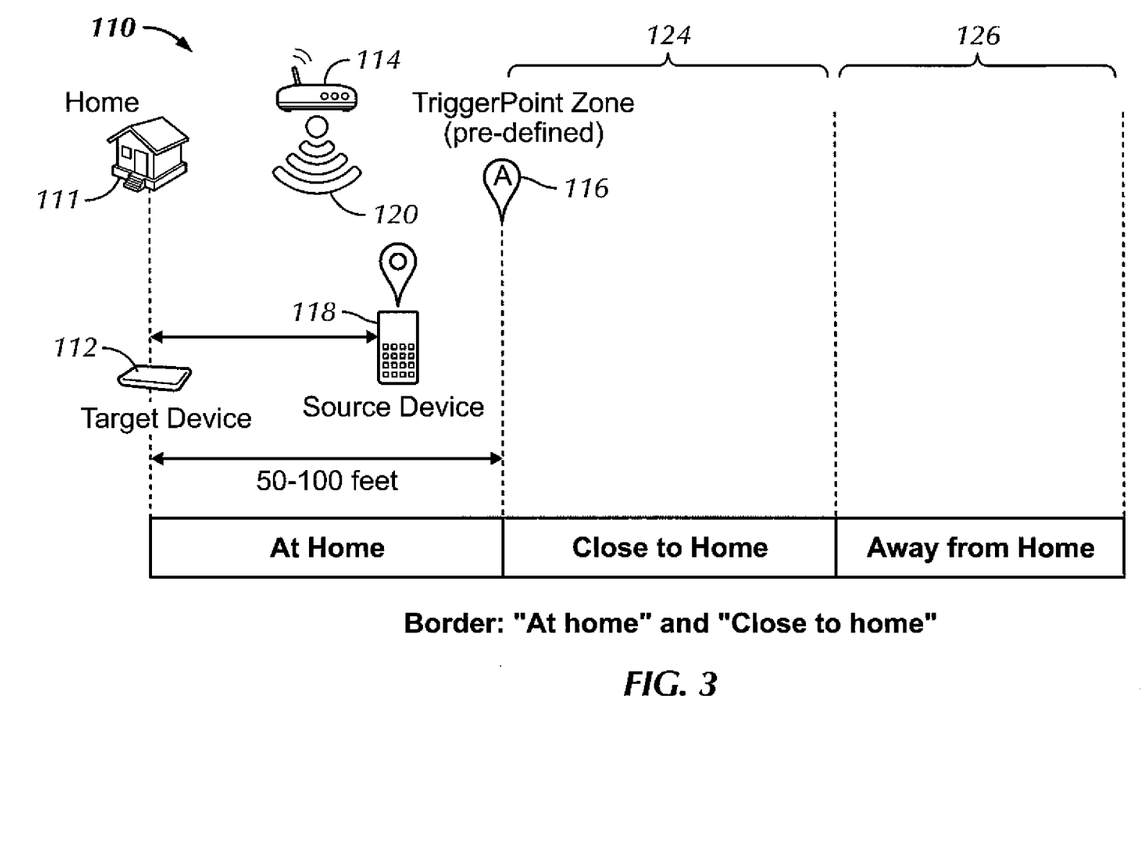
FIGS. 3 and 4 are exemplary diagrams showing plural perimeters around a home location and a source device in relation thereto.

Before describing FIG. 3, note that present principles recognize that the CE devices and appliances described herein may include some or all of the components described in reference to any of the other devices at least to undertake present principles. Even further, it is to be understood that that the respective processors described above are capable of controlling their respective devices and executing all or part of the logic discussed below at least to undertake present principles. Moreover, note that software code implementing present logic executable by the respective processors may be stored on the respective mediums of each device to undertake present principles. For completeness, also note that the respective displays and speakers of the devices shown in FIG. 2 are able to present information in accordance with present principles under control of their respective processors.

Further, note that other CE devices and appliances other than the ones described in reference to FIG. 2 may be used and controlled in accordance with present principles, such as, e.g., digital cameras, music players, personal digital assistants (PDAs), laptop and desktop computers, tablet computers, video game consoles, DVR players, DVD players such as Blue-Ray players, home stereo systems, e-readers such as electronic books, garage door openers, thermostats and HVAC systems, lighting, door locks, clocks, microwaves, fans, radios, etc.

Now in reference to FIG. 3, an exemplary diagram including plural pre-defined distances from a home location is shown. Thus, a home location 110 includes a structure 111 such as a single-family residence. FIG. 3 also shows a target device 112 within the home location 110 that may be, e.g., a tablet computer. Additionally, FIG. 3 shows a modem and/or router 114 establishing a wireless network 120 within the home location 110. It is to be understood that the home location 110 may thus generally extend beyond an actual structure at the home location 110 such as the structure 111 by, e.g., fifty to one hundred feet, as shown by arrows 122, such that the home location 110 extends to a distance illustrated by the dotted line 116. It is to be understood that the home locations disclosed herein may be established by a user who, e.g., selects a preset radius for the home location, and/or may be established by the range of a wireless network established by a router at the home location.

Accordingly, when a source device 118 that may be, e.g., a smartphone is within the radius of the home location 118 (but not necessarily within the structure 111), the target device 112 and source device 118 may communicate over the wireless network 120 so that, e.g., the source device 118 may command the target device 112, send messages, and, or post messages in accordance with present principles. For instance, the source device 118 may send a command to the target device 112 to launch an "App" associated with the target device, such as a Facebook application.

Shown beyond the home location 110 in FIG. 3 is a "close to home" inner distance 124. Beyond the inner distance 124 is an "away from home" outer distance 126, which is understood to be greater than the distance of the inner distance 124 relative to the home location 110.

Figure 4:
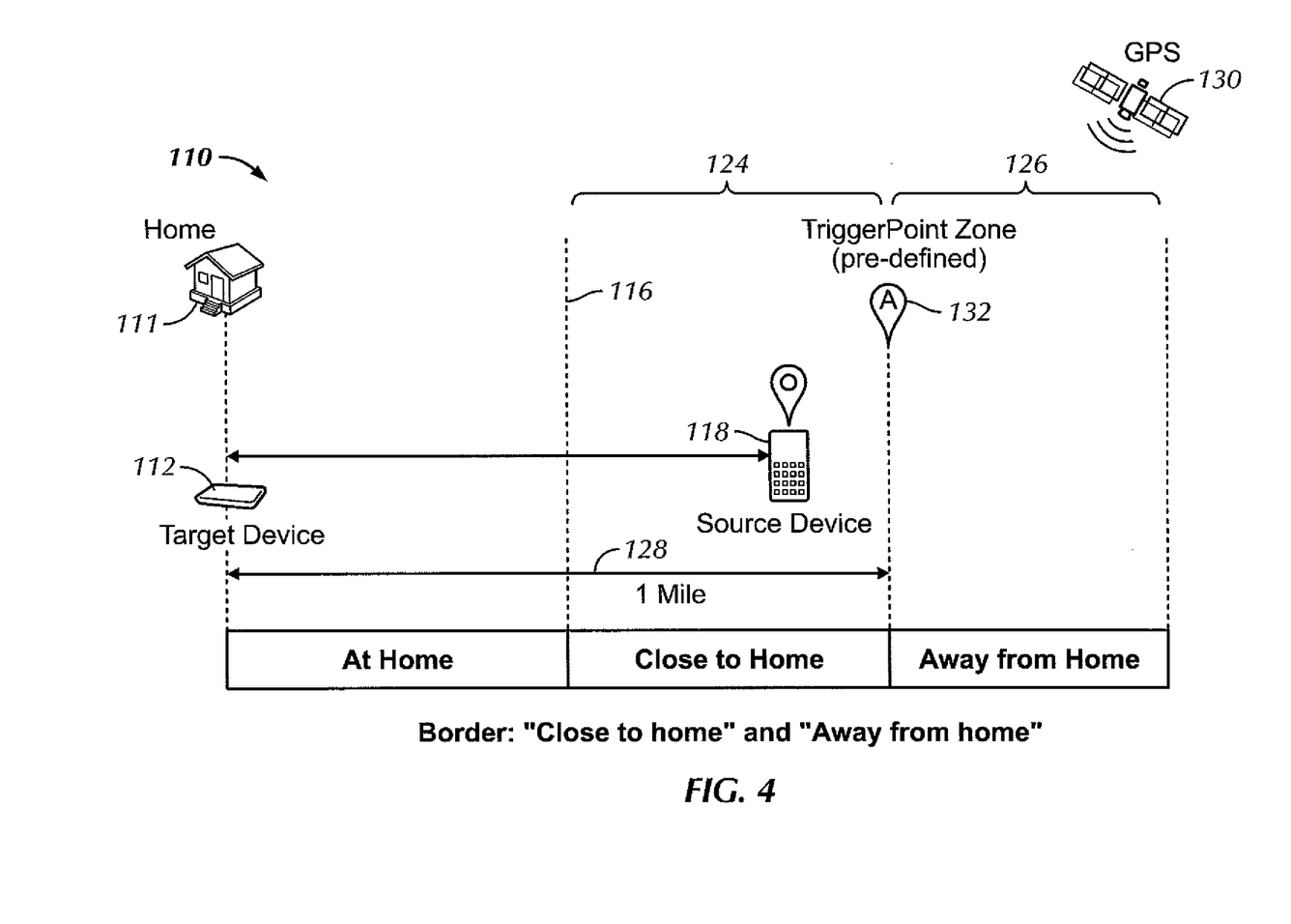

FIG. 4 again shows the home location 110 and the target device 112 located within, e.g., the fifty to one hundred foot radius of the structure 111 establishing the home location 110. However, FIG. 4 shows that the source device 118 is now located outside the home location 110 but within a region established by the inner distance 124. In the exemplary illustration of FIG. 4, the region established by the inner distance 124 is shown as being a distance 100 feet from the structure 111 to approximately one mile from the structure 111, as indicated by arrows 128.

As may also be appreciated from FIG. 4, a GPS satellite 130 is shown, and accordingly the location of the source device 118 may be determined based on communication between the satellite 130 and a GPS transmitter/receiver on the source device 118. Thus, e.g., when the source device 118 passes into the region of the inner distance 124 from the outer distance 126 as delineated by the exemplary dotted line 132, a processor on the source device 118 may make a determination in accordance with present principles such as, e.g., determining based on the device 118 passing the inner distance 124 to send a command to the target device 112 a least partially over, e.g., a 4G wireless network to energize and launch an application on the target device, and then actually send a command to the target device 112 to power on and launch an application. Thus, it may be appreciated that upon receiving such a command, the target device 112 is configured such that it is ready and waiting for immediate use when the user of the source device 118 enters the home location 110 and picks up the target device 112.

Figure 5:
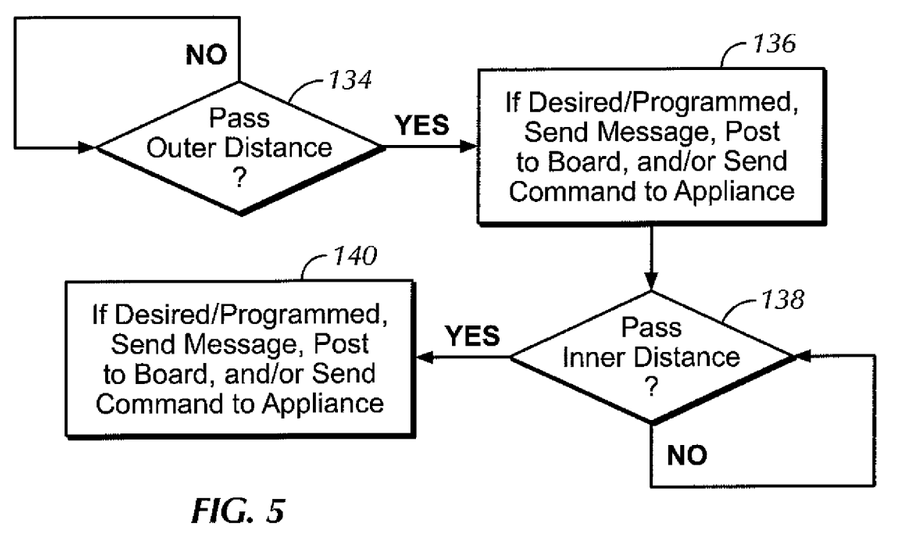
FIGS. 5-8 are flow charts of example logic for sending and receiving messages and commands in accordance with present principles, it being understood that present principles may be implemented by state logic as well as deterministic logic flows.

Continuing the detailed description in reference to FIG. 5, a flow chart of example logic to be executed when a source device passes outer and inner distances toward a location in accordance with present principles is shown. Initially, it is to be understood that present principles (e.g., the logic of FIGS. 5-8) may be implemented by state logic as well as deterministic logic flows. Regardless, beginning at decision diamond 134, the logic determines whether a source device such as, e.g., a smartphone, has passed the perimeter of an outer distance from a location such as the home location described above, into an outer distance region, and is moving toward the home location. If the source device has not passed the perimeter of the outer distance, the logic may loop around and repeat at decision diamond 134 until such time as the source device does indeed pass the perimeter of the outer distance and advances toward the home location.

On the other hand, if the logic determines that the source device has in fact passed the perimeter of the outer distance and is moving toward the home location, the logic proceeds to block 136. At block 136, responsive to the determination made at diamond 134, the logic sends a message to a recipient CE device or appliance (such as another smartphone) at the home location indicating, e.g., that a user of the source device is approaching the home location. In addition to or in lieu of sending the message, at block 136 the logic may also post a message to a message board in accordance with present principles indicating that, e.g., a user of the source device is approaching the home location. Further in addition to or in lieu of the foregoing, at block 136 the logic may configure at least one CE device and/or appliance in accordance with present principles.

Continuing in reference to FIG. 5, after block 136 the logic continues to decision diamond 138, where the logic determines whether the source device continues to move toward the home location such that it passes another perimeter into an inner distance region in accordance with present principles. If the source device has not passed such a perimeter, the logic may loop back to diamond 138 and continue. If, however, the logic determines that the source device has passed such a perimeter and into the inner distance region, the logic moves to block 140 where, responsive to the determination made at diamond 138, the logic sends a message to the same recipient CE device or appliance, and/or at least one other CE device or appliance at the home location indicating that, e.g., that a user of the source device is getting closer to the home location, and/or indicating specifically that the source device is now within the inner distance region and continuing to approach the home location. In addition to or in lieu of sending such message, at block 140 the logic may also post another (or a first) message to the message board indicating that, e.g., a user of the source device is still approaching the home location, and/or is within the inner region and approaching the home location. Further in addition to or in lieu of the foregoing, at block 140 the logic may configure at least one CE device and/or appliance in accordance with present principles. Thus, it may be appreciated that upon passing different perimeters as described in reference to FIG. 5, the status of the source CE device may be updated at recipient CE devices, and different and/or various commands may be sent thereto.

Figure 6:
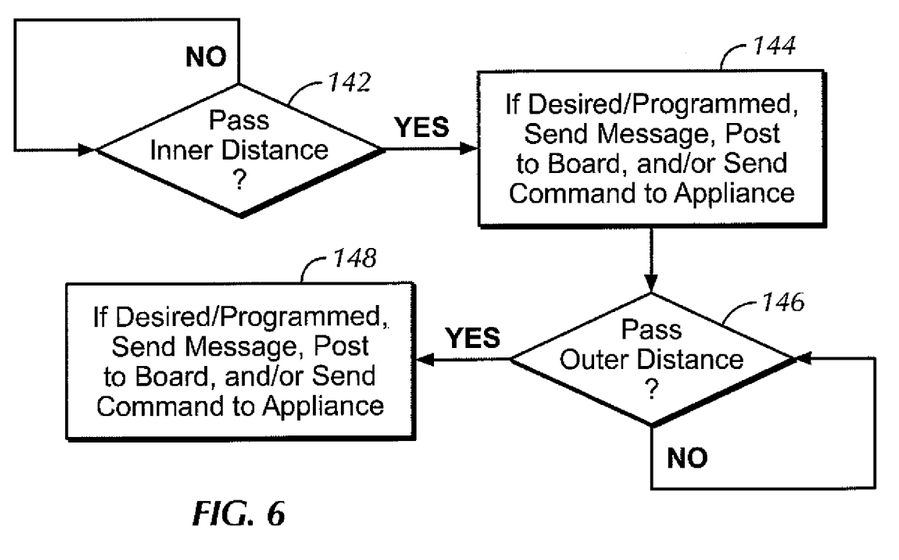

Moving on to FIG. 6, a flow chart of example logic to be executed by a source device when the source device passes inner and outer distances away from a location in accordance with present principles is shown. Accordingly, beginning at decision diamond 142, the logic determines whether a source device such as, e.g., a smartphone, has passed the perimeter of the location into an inner distance region and is moving away to the location. If the source device has not passed the location's perimeter into an inner distance region (e.g., it is still within the location such as a fifty to one hundred foot radius of a structure as described above) the logic may loop back to diamond 142 and repeat until such time as the source device does indeed pass the location's perimeter and into an inner distance region.

On the other hand, if the logic determines that the source device has in fact passed a perimeter into the inner distance region, the logic proceeds to block 144. At block 144, responsive to the determination made at diamond 142, the logic may send a message to a recipient CE device and/or appliance (such as another smartphone) at the home location indicating, e.g., that a user of the source device is moving away from the home location. In addition to or in lieu of sending the message, at block 144 the logic may also post a message to a message board in accordance with present principles indicating that, e.g., a user of the source device is moving away from the home location. Further in addition to or in lieu of the foregoing, at block 144 the logic may configure at least one CE device and/or appliance in accordance with present principles (e.g., power down a TV at the location).

Still in reference to FIG. 6, after block 144 the logic continues to decision diamond 146, where the logic determines whether the source device continues to move away from the home location such that it passes another perimeter from the inner distance region into an outer distance region. If the source device has not passed such a perimeter, the logic may loop back to diamond 146 and continue from there.

If, however, the logic determines that the source device has passed a perimeter into the outer distance region, the logic moves to block 148 where, responsive to the determination made at diamond 146, the logic may send a message to the same recipient CE device or appliance referenced above, and/or at least one other CE device or appliance at the home location indicating that, e.g., that a user of the source device is moving away from the home location, and/or indicating specifically that the source device is now within the outer region and moving away from the home location. In addition to or in lieu of sending such message, at block 148 the logic may also post another (or a first) message to the message board indicating that, e.g., a user of the source device is still moving away from the home location, and/or is within the outer region and moving away from the home location. Further in addition to or in lieu of the foregoing, at block 148 the logic may configure at least one CE device and/or appliance in accordance with present principles. Thus, it may be appreciated that upon passing different perimeters as described in reference to FIG. 6, the status of the source CE device may be updated at recipient CE devices, and different and/or various commands may be sent thereto.

Figure 7:
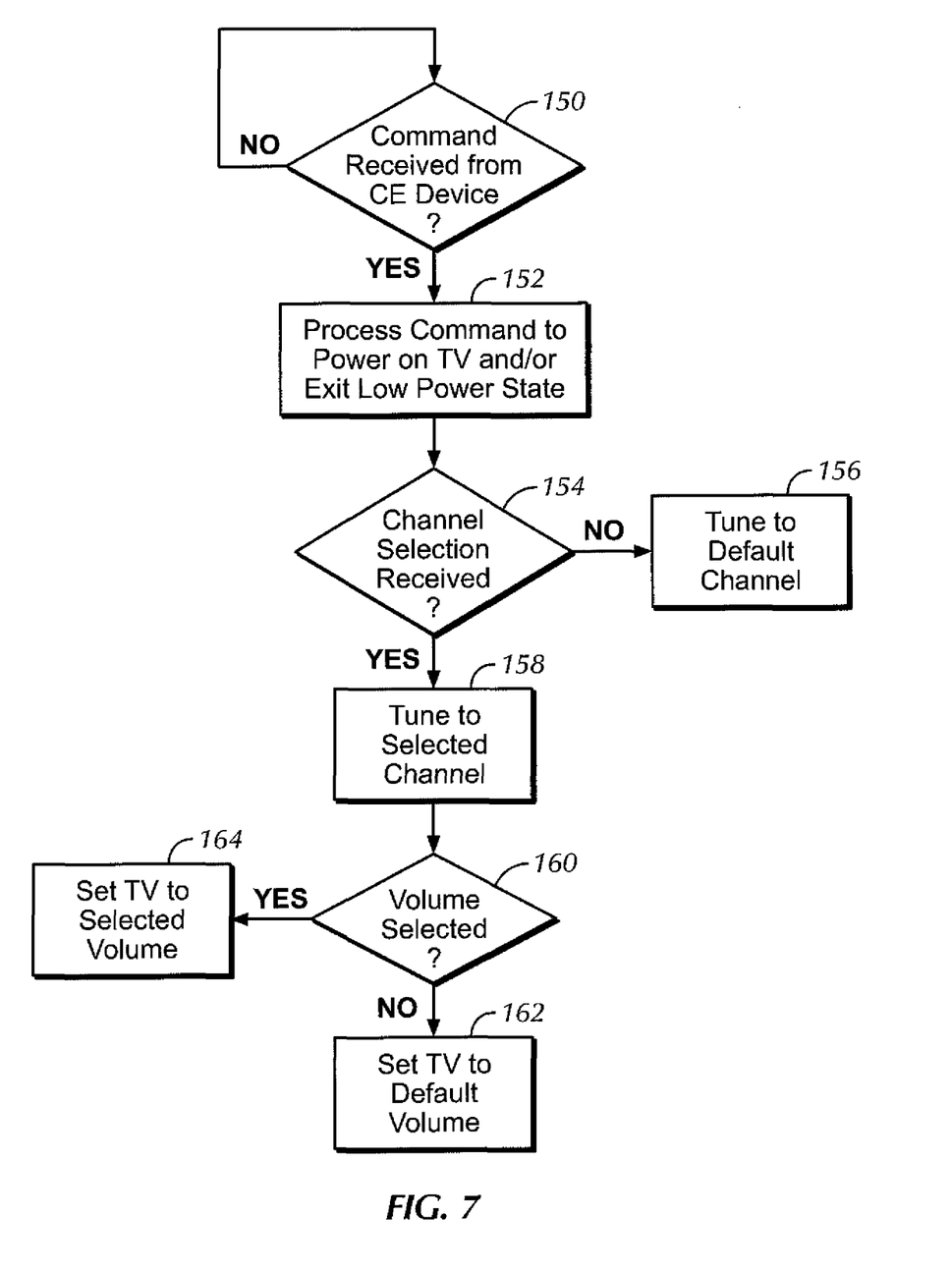

Now in reference to FIG. 7, a flow chart of example logic to be executed by a target device such as a TV after receiving at least one command from a source device in accordance with present principles is shown. Note that although FIG. 7 is described in reference to logic to be executed by a processor controlling the TV, other CE devices and appliances, such as those described above, may be commanded in similar ways using similar logic, but varying for the respective capabilities and functions desired to be commanded for those particular devices and appliances.

Regardless, FIG. 7 begins at decision diamond 150 where the logic determines whether a command has been received from a source device. If one has not, the logic loops back to diamond 150 and continues until such time as a command is received. If, however, the logic determines that a command has been received, the logic continues to block 152 where the logic processes the command and executes it accordingly. In the exemplary embodiment shown, the command is to power on the TV, and thus at block 152 the logic powers on the TV and/or causes it to exit a low power state. The logic then moves to decision diamond 154 where the logic determines whether a channel selection has also been received with the command. If the logic determines that such a command has not been received, the logic moves to block 156 where the logic tunes the TV to a default channel that, e.g., may have been predefined by a user at a different time (e.g., at TV installation or network setup). From block 156 the logic may proceed to decision diamond 160, which will be described shortly.

But first, reverting back to diamond 154, if the logic determines that a channel selection has been received with the command (e.g., a user entered the desired channel at the source device when prompted to do so as described herein), then the logic instead proceeds to block 158 where the logic tunes the TV to the selected channel. The logic then moves to decision diamond 160, where the logic determines whether a particular level of volume for the TV has been included with the received command. If one has not, the logic moves to block 162 where the TV is configured to a default volume that, e.g., may have been predefined by a user at a different time (e.g., at TV installation or network setup). The logic then ends at block 162.

However, if at decision diamond 160 the logic instead determines that a selection for a particular level of volume for the TV has been received, the logic proceeds to block 164 where the logic configures the TV to the volume selection that was received. The logic may then end at block 164.

Furthermore, it is to be understood that still other TV settings may be similarly applied responsive to determinations such as those made at diamonds 154 and 160 in addition to, or in lieu of the determinations and actions specifically described in reference to FIG. 7. Thus, it is to be understood that the logic need not necessarily end at either block 162 or block 164.

For example, other TV setting selections that may be included with a TV command sent from a source device, such as setting a TV brightness level, setting a sleep timer, connecting the device to the Internet, beginning to download data to the TV such as audio video content from, e.g., Netflix or Google TV, causing a welcome screen to be presented on the TV display, causing a weather report to be presented on the TV display, beginning playback of a audio video file on a DVR and/or video player associated with the TV, etc. Moreover, other commands to be executed in accordance with present principles (e.g., responsive to determinations such as those of diamonds 154 and 160) may include powering down the TV and/or entering a low power state, causing a "fake" black screen to appear such that the TV appears to be off but is still energized, etc.

Also note that, if desired, a source CE device may be monitored and/or send messages and commands in accordance with present principles based on perimeters and/or boundaries established within the home location. For instance, a default TV command may be set at a source CE device such that when a user possessing the source CE device walks into one room with a TV from another room, the TV automatically powers on and may also display a "welcome" screen" and/or a webpage. Conversely, when a user leaves a room while possessing the CE device, the TV automatically powers off. These principles for passing perimeters within the home location may be similarly applied to all of the messages and commands disclosed herein (e.g., a tablet can be powered on when a user walks into a room in which the tablet is disposed).

Figure 8:
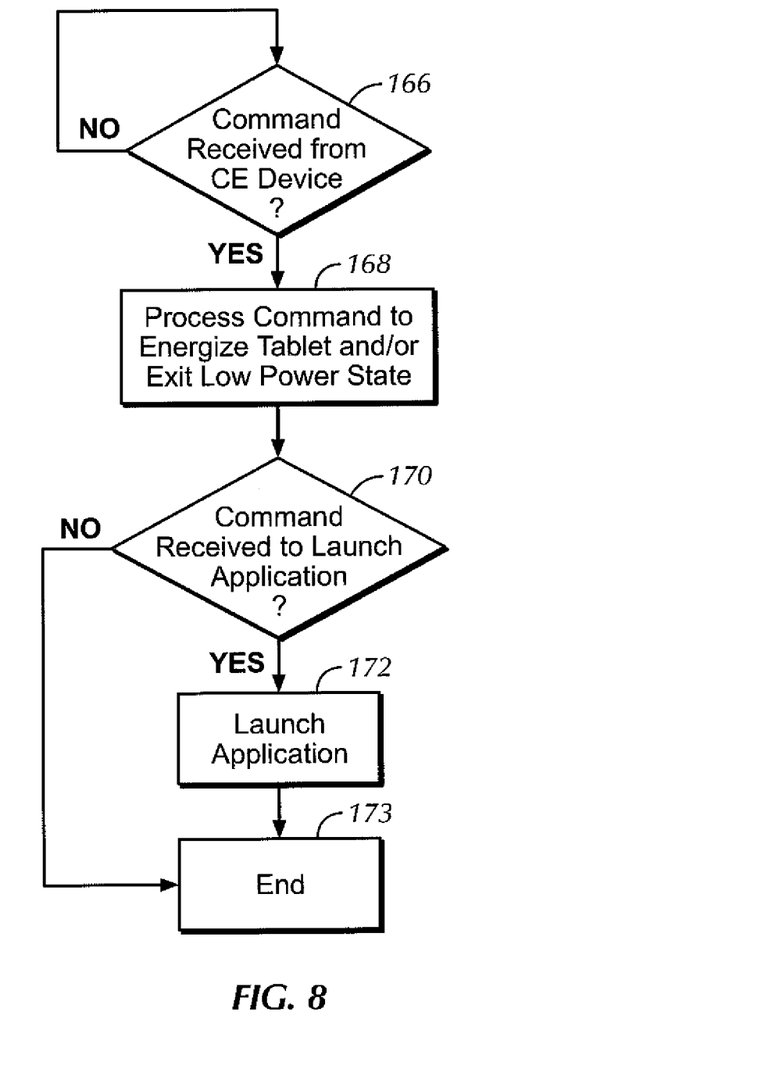

Continuing in reference to FIG. 8, a flow chart of example logic to be executed by a target device such as a tablet computer after receiving at least one command from a source device in accordance with present principles is shown. Note that although FIG. 8 is described in reference to logic to be executed by a processor of a tablet computer, other CE devices and appliances, such as those described above (including a smartphone or electronic message board), may be commanded in similar ways using similar logic but varying for the respective capabilities and functions to be commanded for those particular devices and appliances.

Regardless, FIG. 8 begins at decision diamond 166 where the logic determines whether a command has been received from a source device. If one has not, the logic loops back to diamond 166 and continues until such time as a command is received. If, however, the logic determines that a command has been received, the logic continues to block 168 where the logic processes the command and executes it accordingly. In the exemplary embodiment shown, the command is to power on the tablet and/or exit a low power state, and thus at block 168 the logic powers on the tablet and/or causes it to exit the low power state. The logic then moves to decision diamond 170 where the logic determines whether the command specified that one or more applications associated with the tablet should be launched. If the logic determines that such a command has not been received, the logic may end.

However, if the logic determines that at least one application has been selected for launch on the tablet (e.g., a Facebook app, an ESPN ScoreCenter app, an email app, a weather app, an alarm app, a camera app, a traffic app, a fantasy sports app, a game app, an app store or marketplace app, a calendar app, a photos app, a news app, etc.), the logic moves from diamond 170 to block 172 where the one or more selected applications are launched. The logic then ends at block 173 after launching the one or more applications.

Figure 9:
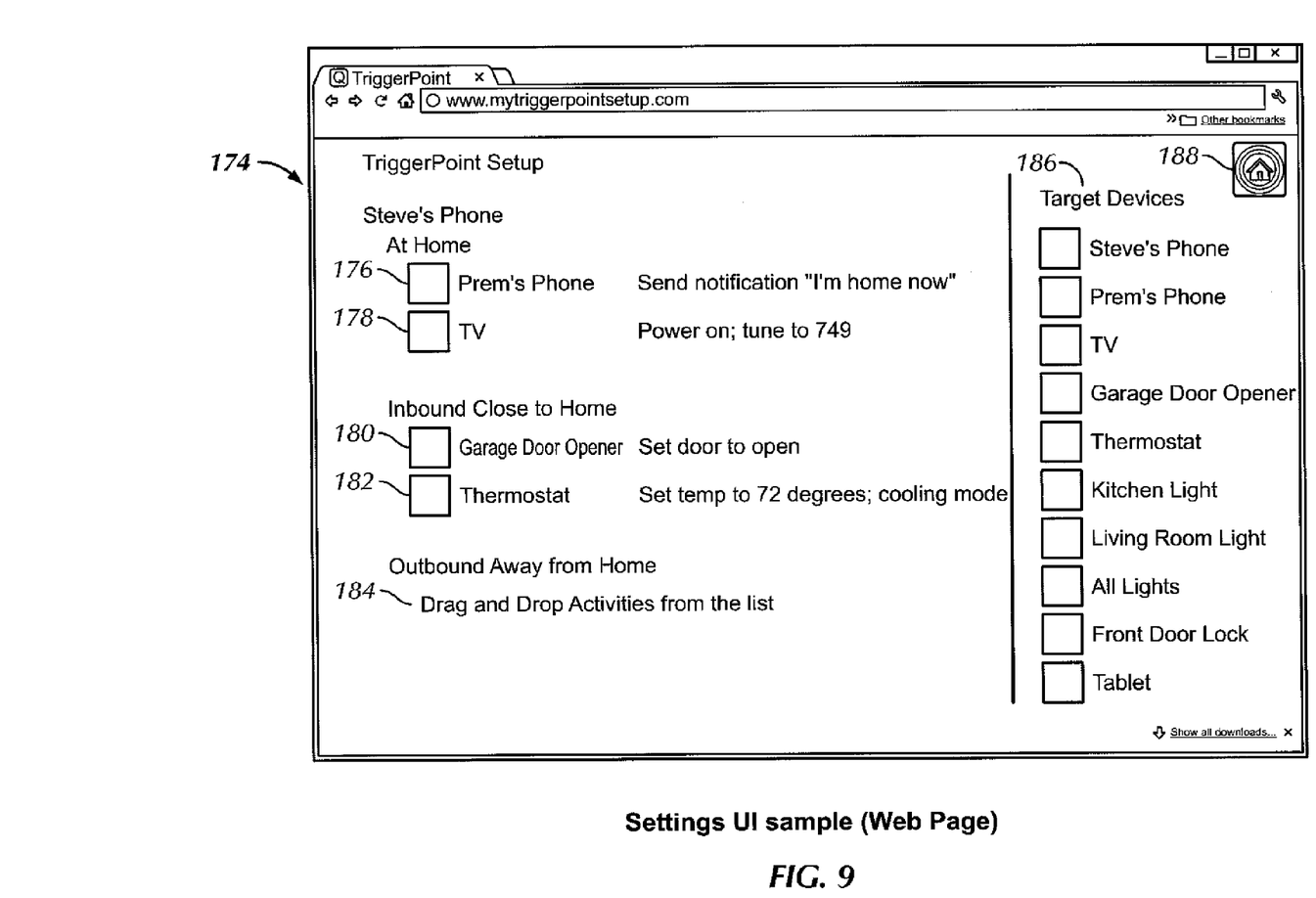
FIGS. 9-16 are exemplary UIs presentable on the devices disclosed herein under control of the respective device's processor in accordance with present principles.

Moving on, FIGS. 9-16 are exemplary user interfaces (UI) presentable on a source device display such as, e.g., a smartphone or onboard vehicle computer under control of the source device's processor. Beginning with FIG. 9, a UI 174 is shown. The UI 174 is understood to be presentable as part of an application on the source device, as its own interface, and/or as a webpage. As shown in FIG. 9, the UI 174 is a webpage. Regardless, it may be appreciated from FIG. 9 that the particular embodiment being described is referred to a "TriggerPoint," copyrighted herein by Sony Corporation, and deriving its name from the fact that crossing a perimeter as described herein "triggers" source devices and target devices to perform various functions.

Thus, the TriggerPoint Setup shown on the UI 174 includes various options for commands and messages to be sent from "Steve's Phone," which is the source device presently being described. As may be appreciated from FIG. 9, a check box 176 and a check box 178 are shown under the "At Home" heading, indicating various options that can be selected such that the associated function is executed when Steve's Phone is determined to be at a home location. Accordingly, check box 176 may be selected such that a notification message indicating "I'm home now" may be sent to another device—in this case, "Prem's phone." Check box 178 may be selected such that when Steve's Phone passes within the home location, a TV located at the home location is powered on and the TV is tuned to preselected channel 749.

Furthermore, in exemplary embodiments, the text "Send notification 'I'm home now'" and "Power on; tune to 749" are selectable such that they may cause another UI to be presented to change the text and/or information represented by the text. So, for instance, the text of the notification message may be selected and then changed, e.g., on another UI. Similarly, the channel preset may be selected and then changed from 749 to a different channel, e.g., on another UI. Even further, in other embodiments such changes may be entered on a window overlay rather than at a subsequent, lower-level UI.

Still in reference to FIG. 9, two exemplary check boxes are shown for when the source device Steve's Phone is, e.g., within an inner distance region. Thus, check box 180 may be selected to cause a garage door at the home location to be configured in an open position so that the garage door is configured to the open position when, e.g., Steve pulls into the driveway at the home location.

Further, check box 182 may be selected to cause a configuration of the thermostat at the home location. As may be appreciated from the text next to check box 182, if the box 182 is selected when Steve's Phone is within the inner distance region, Steve's Phone will send a command to the thermostat to set the temperature at the corresponding location to seventy two degrees and configure it in a cooling or heating mode. Note that just as the text next to the boxes 176 and 178 may be selectable to change the corresponding "presets," the text next to boxes 180 and 182 is similarly selectable to change the "presets" associated with the garage door opener and thermostat, respectively.

Further describing the UI 174, note that it does not show any "Outbound Away from Home" check boxes to cause Steve's Phone to send messages and/or commands in such a situation (e.g., Steve's Phone is moving away from the home location and/or passing perimeters such as those described above). However, as may be appreciated from text 184, activities such as a TV checkbox for powering down the TV may be dragged and dropped from an activity list (not shown for clarity) so that boxes associated with the dragged and dropped activities may presented and be selectable to cause associated messages and commands to be sent while Steve's Phone is moving away from the home location. The activities list may include any of the functions described herein, such as, e.g., powering down a laptop computer or commanding a coffee maker to turn off.

Though an activities list is not shown on the UI 174, a target device list 186 is shown. The target device list includes various devices that may be dragged and dropped into sections on the left side of the UI 174 and be commanded and/or receive message accordingly, such as the "At Home" section or the "Inbound Close to Home" section previously described. Thus, in exemplary embodiments, one of the devices from the list 186 may be dragged and dropped to, e.g., the "Inbound Close to Home" section. No text may be associated with the recently dragged and dropped target device, but, e.g., an icon or empty text box may be presented instead, where the icon or empty text box may be selectable to then cause another UI to be presented from which a message and/or command can be specified which is to be sent to the target device when within the inner distance region.

It is to be understood that such target device "setup" can be performed not just by dragging and dropping to the "Inbound Close to Home" section, or otherwise causing a target device from the list 186 to be presented in one of the location-based sections on the left side of the UI 174, but to any location-based section such as the other ones shown or any section derived from the regions, distances, and perimeters described herein. Accordingly, it is to also be understood that the exemplary UI 174 is non-limiting and other location-based sections other than those shown may be included in a similar UI in accordance with present principles.

Figure 10:
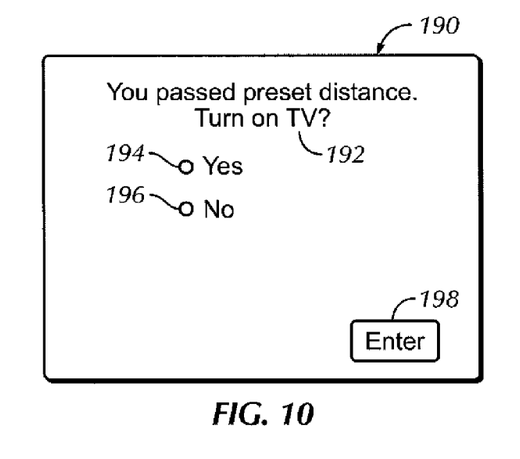

Before describing FIG. 10, for completeness note that still other selectors may be presented on the UI 174. Thus, for example, a selectable "Home" icon 188 is shown. The icon 188 is selectable to cause a "home screen" of Steve's Phone to be presented when a user (e.g., Steve) is done configuring the TriggerPoint Setup.

Now in reference to FIG. 10, another exemplary UI presentable on a source device such as, e.g., a smartphone or onboard vehicle computer under control of the device's processor is shown. Thus, a UI 190 is shown and includes text 192 informing a user of the source CE device that a preset distance from a location has been passed. The text 192 also instructs the user to decide whether to turn on a TV at the location, if desired, in anticipation of arriving at the location (it being understood that in the present exemplary description, the CE device has passed a preset distance and is moving toward the location). Thus, a "yes" radio button 194 and a "no" radio button 196 are presented on the UI 190 to allow a user to select whether to turn on the TV using the radio buttons and then select the "enter" button 198 also shown on the UI 190 to input the selection.

Figure 11:
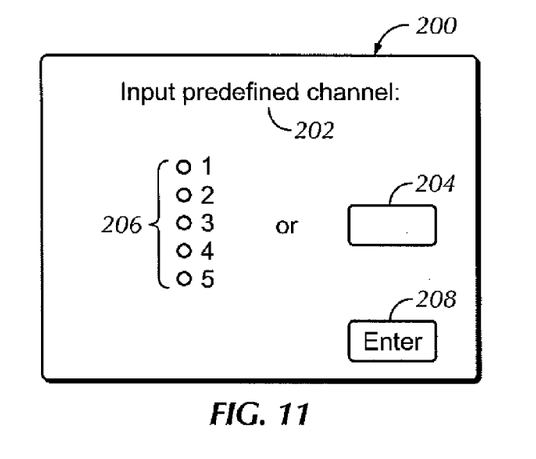

Furthermore, responsive to the user selecting to turn on the TV at the exemplary UI 190, the UI 200 of FIG. 11 may be presented (it being understood that if the "no" radio button 196 was selected and then the "enter" button 198 was selected, the CE device may either stop presenting UIs and return to whatever state and/or display status it was in before passing the preset distance, and/or may present a UI for commanding a different device and/or sending or posting a message in accordance with the principles set forth herein). The UI 200 includes text 202 requesting the user of the source CE device input a desired channel in the input box 204 or select from radio buttons 206 for respective channels such as, e.g., channel one through channel five as shown. The UI 200 also includes an enter button 208 to input the selection to the processor of the CE device and cause the CE device to include the channel selection in the command(s) being sent to the TV in accordance with present principles.

Figure 12:
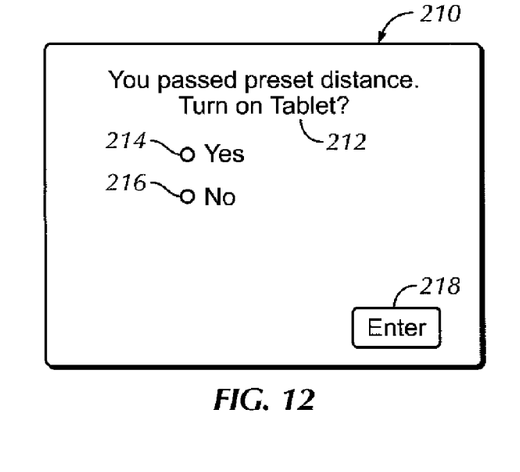

Turning now to FIG. 12, an exemplary UI presentable on a source CE device display for sending a command to, e.g., a tablet computer at a location distanced from the CE device in accordance with present principles is shown. Accordingly, a UI 210 includes text 212 informing a user of the source CE device that a preset distance from a location has been passed. The text 212 also instructs the user to decide whether to turn on a tablet computer at the location, if desired, in anticipation of arriving at the location (it being understood that in the present exemplary description, the CE device has passed a preset distance and is moving toward the location). Thus, a "yes" radio button 214 and a "no" radio button 216 are presented on the UI 210 to allow a user to select whether to turn on the tablet using the radio buttons and then select the "enter" button 218 also shown on the UI 210 to input the selection.

Figure 13:
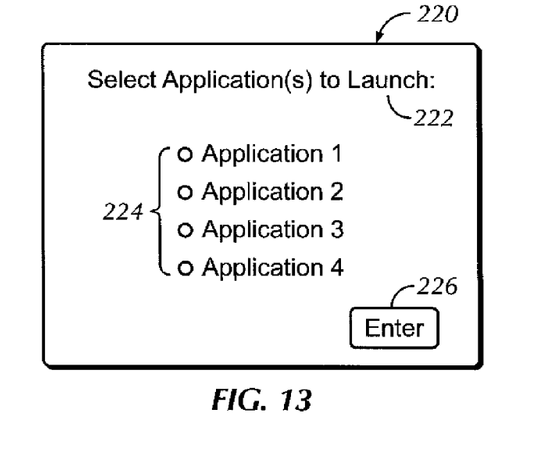

In addition, responsive to the user selecting to turn on the tablet at the exemplary UI 210, the UI 220 of FIG. 13 may be presented (it being understood that if the "no" radio button 216 was selected and then the "enter" button 218 was selected, the CE device may either stop presenting UIs and return to whatever state and/or display status it was in before passing the preset distance, and/or may present a UI for commanding a different device and/or sending or posting a message in accordance with the principles set forth herein). The UI 220 includes text 222 asking the user of the source CE device whether, in addition to turning on the tablet, the user wishes to launch one or more applications associated with the tablet so that the applications are immediately ready for use when the user arrives home and wishes to use the tablet. Thus, plural radio buttons 224 are shown, each one being associated with a different application on the tablet that may be launched such as, e.g., Facebook, ESPN ScoreCenter, Gmail, and an App Store/Marketplace.

Figure 14:
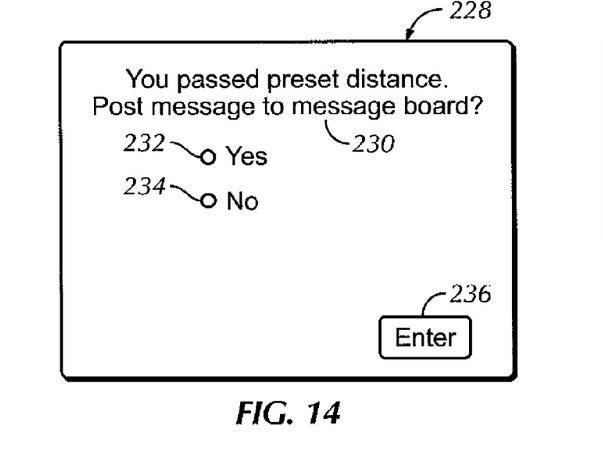

Now addressing FIG. 14, yet another exemplary UI presentable on a source CE device display is shown, this time for posting a message/comment to, e.g., an electronic message board and/or message board application on a tablet computer at a location distanced from the CE device in accordance with present principles. FIG. 14 thus shows a UI 228, which includes text 230 informing a user of the source CE device that a preset distance from a location has been passed. The text 230 also instructs the user to decide whether to post a message to a message board at the home location indicating, e.g., that the user is approaching the location, though it is to be understood that still other messages may be sent to the message board for presentation thereon in accordance with present principles. Regardless, the UI 228 also includes a "yes" radio button 232 and a "no" radio button 234 to allow a user to select whether to post a message to the message board at the home location. The UI 228 also includes an "enter" button 236 so that the user may input the selection to the processor in accordance with present principles.

Figure 15:
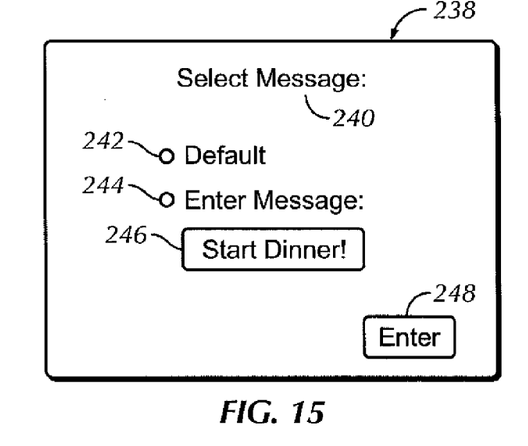

In addition, responsive to the user selecting to post a message to the message board by e.g., selecting the "yes" radio button 232 and then "enter" button 236, the UI 238 of FIG. 15 may be presented (it being understood that if the "no" radio button 2234 was selected and then the "enter" button 236 as selected, the CE device may either stop presenting UIs and return to whatever state and/or display status it was in before passing the preset distance, and/or may present a UI for commanding a different device and/or sending or posting a message in accordance with the principles set forth herein). The UI 238 includes text 240 indicating that the user of the CE device may select whether to post a default notification that may be, e.g., a generic notification stored on a storage medium of the CE device by the device manufacturer, and/or may be a default message input by a user of the CE device prior to the present instance where the CE device has passed a preset distance. Regardless, radio button 242 may be selected for such a default message.

The UI 238 also includes a radio button 244 for selection in conjunction with text box 246 where a user may enter a unique message to be posted to the message board. This may be done using an input device such as a keyboard, as well as done by input using voice commands should, e.g., the CE device be an onboard vehicle computer system and the user be driving the vehicle at the time the UI 238 is presented (it being understood that input to the UIs described in reference to any of FIGS. 9-16 and any other input described herein may be similarly performed using, e.g., voice commands or keyboard input). Either way, once either of the radio buttons 242 or 244 have been selected, and possibly text entered to box 246, enter button 248 may be selected to input the selection to the processor and cause the processor to include the selected message in the command to be sent to the message board in accordance with present principles.

Figure 16:
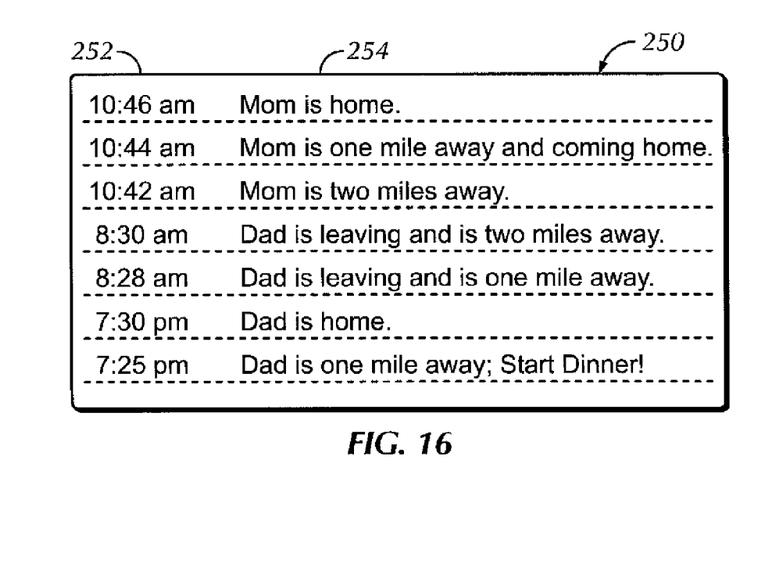

Now addressing FIG. 16, an exemplary UI and/or information screen is shown that may be presented on a message board at a location such as the home location described herein. Thus, the message board UI 250 includes times for when each respective message was received by the message board in a first column 252, and may also include dates if desired (though not shown). Note that the times in column 252 are in reverse chronological order such that the most recent message received from, e.g., a source CE device distanced from the location where the message board is disposed is presented at the top of the UI 250. However, note that still other arrangements of the messages may be presented on the UI 250, such as presenting them in chronological order or random order.

Regardless, the UI 250 also shows at least a second column 254 where the messages that were received by the message board in accordance with present principles are presented. It is to therefore be understood that for each entry, a time in the first column 252 corresponds to the message in the column 254 received at that time. For instance, at 10:46 a.m. a message was received and posted to the message board indicating "Mom is home."

It is to be further understood that the message board may display not just messages received from source CE devices distanced from the home location based on the source CE device passing a preset distance as described herein, but may combine such messages with other messages received by and/or input to the message board. For instance, in addition to messages from source CE devices, the message board may also post messages that were input directly to the message board itself, received through a text message from a CE device already at the location, received through an email, etc.

Even further, it is to be understood that the message board may present and/or highlight various messages differently from each other. For instance, some messages may be presented in black text, while other messages may be blinking and/or presented in red text or another color. Thus, a user of a CE device may specify that a message to be posted to the message board to "Start Dinner" should be presented in blinking red text on the message board. As another example, the message board may always present messages from different CE devices differently such that, e.g., a message sent from a parent's source CE device and posted to the message board is posted in blue text, while a message sent from a child's source CE device and posted to the message board is posted in green text, where the text characters of the child's message are presented in a different font than the parent's message. This may be accomplished by programming the message board itself to present information in such ways based on the device that sent the message, and/or may be programmed at or by the source CE device and specified in the message transmitted to the message board.

For completeness, note that the principles set forth above when discussing the UIs of FIGS. 9-16 may also be applied to instances when a source device is moving away from a location as well. For example, a user may be prompted to power down a TV and/or tablet computer once a preset distance has been passed. Also for completeness, note that should a selection not be received by the logic and/or using any of the exemplary UIs discussed herein (e.g., no message board message is selected as shown in FIG. 15 if the UI is ignored while driving) the logic may end, and/or the logic may use defaults (e.g., automatically select the default message and transmit it to be message board).

Furthermore, present principles recognize that detecting whether a source device has passed a particular distance as set forth above may be performed by the source CE device itself, and/or a server in communication with the CE device and using, e.g., GPS technology. Even further, a server may also act as an intermediary in accordance with present principles, though in some embodiments the source CE device and CE device/appliance at the location may be in direct communication with each other. Thus, e.g., a source CE device may first transmit a message to be posted to a message board to a server, where the server then forwards the message to the message board, e.g., through a gateway at the home location.

Finally, note that cloud computing/technology may also be used in accordance with present principles.

Accordingly, it may now be appreciated that CE device users such as family members may track each other's locations and movements, and also control other CE devices, appliances, and apparatuses at a certain location, based on certain "triggers." Thus, the concept of a "smart home" where plural devices are networked with each other and with devices outside the home is advantageously improved.

While the particular SYSTEM AND METHOD FOR SENDING MESSAGES AND COMMANDS TO A DEVICE AT A LOCATION DISTANCED FROM THE SENDING DEVICE is herein shown and described in detail, it is to be understood that the subject matter which is encompassed by the present invention is limited only by the claims.

What is claimed is:

1. At least one computer readable storage medium that is not a transitory signal, the computer readable storage medium comprising instructions executable by at least one processor to:
   responsive to a determination that a device is passing an outer distance from a home location going toward the home location, send a first message to a recipient apparatus at the home location which indicates human-perceptibly that a user of the device is approaching the home location; and
   responsive to a determination that the device is passing an inner distance from the home location going toward the home location, send a second message different from the first message to a recipient apparatus at the home location which indicates that a user of the device is approaching the home location, the inner distance being less than the outer distance.

2. The computer readable storage medium of claim 1, wherein the instructions are executable by the at least one processor to, responsive to a determination that the device is passing the outer distance from the home location going away from the home location, send a message to a recipient apparatus at the home location which indicates that a user of the device is moving away from the home location.

3. The computer readable storage medium of claim 1, wherein the instructions are executable by the at least one processor to, responsive to a determination that the device is passing the outer distance from the home location going away from the home location, send a command to at least one appliance at the home location to establish at least one configuration of the appliance.

4. The computer readable storage medium of claim 1, instructions are executable by the at least one processor to, responsive to a determination that the device is passing the inner distance from the home location going away from the home location, send a message to a recipient apparatus at the home location which indicates that a user of the device is moving away from the home location.

5. The computer readable storage medium of claim 1, instructions are executable by the at least one processor to, responsive to a determination that the device is passing the inner distance from the home location going away from the home location, send a command to at least one appliance at the home location to establish at least one configuration of the appliance.

6. The computer readable storage medium of claim 3, wherein the configuration established responsive to the determination that the device is passing the inner distance from the home location going away from the home location is to power down the appliance and/or enter a low power state.

7. The device of claim 1, wherein the instructions are executable to:
responsive to a determination that the device is passing the outer distance from the home location going toward the home location, send a command to at least one appliance at the home location to establish at least one configuration of the at least one appliance, the command being a brightness level for output from a display device.

8. The at least one computer readable storage medium of claim 1, wherein the instructions are executable to:
responsive to the determination that the device is passing the outer distance from the home location going toward the home location, send a first message which indicates that the user of the device is approaching the home location; and
responsive to the determination that the device is passing the inner distance from the home location going toward the home location, send a second message different from the first message which indicates at least one of: that the user of the device continues to approach the home location, that the user of the device is within the inner distance.

9. The at least one computer readable storage medium of claim 1, wherein at least one message that is sent to the recipient apparatus comprises information received from the user of the device once the device passes at least one of the outer distance from the home location going toward the home location and the inner distance from the home location going toward the home location.

10. The at least one computer readable storage medium of claim 1, wherein the device comprises the at least one computer readable storage medium.

11. A method, comprising:
detecting the position of a consumer electronics (CE) device; and
responsive to a determination that the CE device is passing a predefined distance from a home location, presenting on a display remote from the CE device a user interface (UI), the UI presenting:
plural times of receipt for respective messages;
the respective messages juxtaposed with the respective times of receipt;
at least a first message being presented in a first presentation mode and at least a second message being presented in a second presentation mode different from the first presentation mode.

12. The method of claim 11, further comprising, responsive to a determination that the CE device is passing the predefined distance from the home location going toward the home location, sending a message to at least recipient device at the home location that indicates a user of the CE device is approaching the home location.

13. The method of claim 11, wherein the apparatus is a television and the command sent thereto is a command to power on the television and to cause the television to present content from a channel; and
wherein prior to sending the command, the method includes prompting a user of the CE device to input selection of a channel to the CE device, receiving the selection at the CE device, and including the channel selection in the command that is sent.

14. The method of claim 11, further comprising:
responsive to a determination that the CE device is passing the predefined distance from the home location, audibly presenting at least some information associated with at least one of the respective messages.

15. An apparatus, comprising:
at least one processor;
at least one computer readable storage medium accessible to the processor and comprising instructions which when executed by the processor cause the processor to execute logic comprising:
receiving at least one command to establish at least one configuration of a first device, the at least one command being received from a second device distanced from the first device responsive to a determination that the second device is passing a predefined distance from the location of the first device; and
configuring the first device at least in part based on the at least one command;
wherein the at least one command comprises at least one of: a command to establish a volume level for audio output from the first device, a command to initiate a download of audio video (AV) data to the first device from an AV content provider.

16. The apparatus of claim 15, wherein the apparatus is the first device.

17. The apparatus of claim 15, wherein the at least one command comprises a command to establish a volume level for audio output from the first device.

18. The apparatus of claim 15, wherein the at least one command comprises a command to initiate a download of audio video (AV) data to the first device from an AV content provider.

19. The apparatus of claim 15, wherein the at least one command comprises a command to present a welcome message on a display of the first device.

20. The apparatus of claim 15, wherein the at least one command comprises a command to present weather information on a display of the first device.

* * * * *